United States Patent
Marks et al.

(10) Patent No.: US 7,512,715 B2
(45) Date of Patent: Mar. 31, 2009

(54) SYSTEM AND METHOD FOR REQUESTING A RESOURCE OVER AT LEAST ONE NETWORK WITH REDUCED OVERHEAD

(75) Inventors: Bennett Marks, Carlisle, MA (US);
Oren Levine, Waltham, MA (US);
Steven Lewontin, Cambridge, MA (US)

(73) Assignee: Nokia Corporation, Espoo (FI)

( * ) Notice: Subject to any disclaimer, the term of this patent is extended or adjusted under 35 U.S.C. 154(b) by 892 days.

(21) Appl. No.: 10/672,977

(22) Filed: Sep. 26, 2003

(65) Prior Publication Data

US 2005/0080870 A1      Apr. 14, 2005

(51) Int. Cl.
G06F 15/16     (2006.01)
G06F 15/173    (2006.01)
H04J 3/24      (2006.01)
H04J 3/18      (2006.01)

(52) U.S. Cl. .................. 709/247; 709/238; 709/236; 709/228; 370/474; 370/477

(58) Field of Classification Search ........... 709/219, 709/236, 237, 228, 247, 238, 227; 370/474, 370/477
See application file for complete search history.

(56) References Cited

U.S. PATENT DOCUMENTS

| | | | |
|---|---|---|---|
| 5,627,829 A * | 5/1997 | Gleeson et al. | 370/230 |
| 6,385,199 B2 * | 5/2002 | Yoshimura et al. | 370/393 |
| 6,397,259 B1 * | 5/2002 | Lincke et al. | 709/236 |
| 6,401,171 B1 | 6/2002 | Klein et al. | |
| 6,424,625 B1 | 7/2002 | Larsson et al. | |
| 6,438,123 B1 * | 8/2002 | Chapman | 370/351 |
| 6,542,504 B1 * | 4/2003 | Mahler et al. | 709/247 |
| 6,680,955 B1 * | 1/2004 | Le | 370/477 |
| 6,683,865 B1 * | 1/2004 | Garcia-Luna-Aceves et al. | 370/349 |

(Continued)

FOREIGN PATENT DOCUMENTS

WO     WO 97/40457     10/1997

(Continued)

OTHER PUBLICATIONS

H. Nielsen, P.Leach, S. Lawrence; *An HTTP Extension Framework*; Feb. 2000; 21 pages; Network Working Group Request for Comments: 2774; The Internet Society (2000).

(Continued)

*Primary Examiner*—Kevin Bates
(74) *Attorney, Agent, or Firm*—Alston & Bird LLP

(57) ABSTRACT

Systems and methods are provided for requesting a resource over at least one network. The system includes a network entity, such as a gateway or an origin server, capable of receiving a resource request for the resource. The resource request includes a group header identifier such that the network entity is capable of identifying at least one header field associated with the group header. By identifying the header fields associated with the group header, the resource request can be processed in accordance with the associated header fields. Before receiving the resource request, the network entity can be capable of receiving a earlier request from a terminal, where the earlier request includes at least one header field and a call for associating the at least one header field with a group header identifier. The network entity can then be capable of associating the header fields with a group header identifier.

20 Claims, 5 Drawing Sheets

U.S. PATENT DOCUMENTS

| | | | |
|---|---|---|---|
| 6,751,209 B1 * | 6/2004 | Hamiti et al. | 370/349 |
| 6,804,238 B1 * | 10/2004 | Euget et al. | 370/392 |
| 6,839,339 B1 * | 1/2005 | Chuah | 370/349 |
| 6,967,964 B1 * | 11/2005 | Svanbro et al. | 370/437 |
| 7,035,287 B2 * | 4/2006 | Tourunen et al. | 370/477 |
| 7,136,395 B2 * | 11/2006 | Lupien et al. | 370/472 |
| 7,215,684 B1 * | 5/2007 | Rosen et al. | 370/477 |
| 7,430,617 B2 * | 9/2008 | Walsh et al. | 709/247 |
| 2002/0073216 A1 | 6/2002 | Gaur | |
| 2002/0077993 A1 | 6/2002 | Immonen et al. | |
| 2002/0087683 A1 | 7/2002 | Szondy | |
| 2003/0028805 A1 | 2/2003 | Lahteenmaki | |
| 2003/0061337 A1 | 3/2003 | Sato et al. | |
| 2005/0018666 A1 * | 1/2005 | Davila et al. | 370/389 |

FOREIGN PATENT DOCUMENTS

| | | |
|---|---|---|
| WO | WO 99/56431 | 11/1999 |
| WO | WO 02/062026 A1 | 8/2002 |

OTHER PUBLICATIONS

R. Fielding, J. Gettys, J. Mogul, H. Frystyk, L. Masinter, P. Leach, T. Berners-Lee; *Hypertext Transfer Protocol—HTTP/1.1*; Jun. 1999; 177 pages; Network Working Group, Request for Comments: 2616; The Internet Society (1999).

* cited by examiner

SYSTEM AND METHOD FOR REQUESTING A RESOURCE OVER AT LEAST ONE NETWORK WITH REDUCED OVERHEAD

FIELD OF THE INVENTION

The present invention generally relates to systems and methods for requesting a resource over at least one network and, more particularly, relates to systems and methods for requesting a resource with reduced overhead.

BACKGROUND OF THE INVENTION

Devices communicating over networks such as the Internet can utilize any of a number of different transport protocols including, for example, the Hypertext Transfer Protocol (HTTP) version 1.1, as such is described in the Internet Engineering Task Force (IETF) request for comment document RFC 2616, entitled: *Hypertext Transfer Protocol —HTTP/1.1*, the contents of which are hereby incorporated by reference in its entirety. The overhead of transport protocols such as HTTP is not viewed as a problem for wireline network communications. However, the same overhead is often viewed as a major performance burden in the wireless environment, which is far more sensitive to the amount of transmitted data.

When transmitting small packets of data, transport protocols such as HTTP can be swamped by the overhead associated with the inclusion of HTTP meta-data, as such may be included within fields of request headers. For example, a typical wireless device may send upwards of 800-900 bytes of request header information in each HTTP transaction. And such header information may represent 75% or more of the transmitted data in an HTTP request. As will be appreciated, a request header may include fields of information that define acceptable responses to the requests, including the media types, character sets, content codings, sets of preferred natural languages, and byte ranges of acceptable responses. In this regard, many request header fields typically do not change from request to request while in a browsing or other network communication session. The problem is that repeatedly transmitting the same data in a browsing or other network communication session makes the use of HTTP, when sending small packets, slow when compared to other transmission protocols such as the Wireless Session Protocol (WSP). As will be appreciated, the crossover point at which HTTP begins to outperform WSP is typically when the total packet size of transmitted data is at least approximately 10K bytes. However, most packets in the wireless environment are smaller then 10 K bytes.

One technique for client devices, such as wireless mobile stations, to reduce the overhead associated with request header fields in HTTP transmissions is to cache such headers during a communication session between client devices. For example, protocols such as Wireless Application Protocol (WAP) and Wireless Session Protocol (WSP) define clients and servers communicating in discrete communication sessions. In initiating a communication session, a client may send a number of header fields to a server or proxy. The header fields may then be cached by the other system element(s) for reference during the communication session. Such a technique is adequate for reducing the overhead of HTTP transmissions, but techniques such as those specified by WAP and WSP are based upon communication sessions between clients and servers. In this regard, to initiate each subsequent communication session between the same client and server, the initiating client must send the header fields to the responding client or proxy, with the other system element(s) again caching the header fields for the respective communication session.

Another typical way for client devices to eliminate the overhead associated with request header fields in HTTP transmissions, such as those defining acceptable responses, is simply not to send them. In lieu of conventional request header fields that define the content that is acceptable to a client device, the client device may send HTTP requests including a single Accept header that accepts everything (i.e., */*). And whereas such a technique is adequate to reduce the overhead associated with HTTP transmissions, such a technique has drawbacks. In this regard, by accepting all content to the client device, the client device will often receive content that it cannot process. In such instances, much, if not all, of the savings associated with small headers is lost when content is transmitted to the terminal that must then be rejected.

SUMMARY OF THE INVENTION

In light of the foregoing background, embodiments of the present invention provide improved systems, methods and computer program products for requesting resources over at least one network. More particularly, according to embodiments of the present invention, one or more header fields in requests from a client may be replaced by a group header identifier. Before the requests are processed, then, the header fields associated with the respective group header identifiers may be identified such that the requests can be processed based upon the respective group header identifiers. Advantageously, the group header identifier can be transmitted instead of the associated header fields thereby reducing the overhead of messages transmitted over the wireless link. And as will be appreciated by those skilled in the art, transmitting the group header identifier over a wireless link can greatly decrease the overhead associated with wireless network communication that otherwise requires the all associated header fields to be transmitted over the wireless link. By reducing the overhead of messages, network communication can occur without the reduction in speed otherwise associated with increased overhead.

According to one aspect of the present invention, a system is provided for requesting a resource over at least one network. The system includes a network entity, such as a gateway or an origin server, capable of receiving a resource request (e.g., HTTP request) for the resource. The resource request includes a group header identifier such that the network entity is capable of identifying at least one header field associated with the group header. By identifying the header fields associated with the group header, the resource request can be processed in accordance with the associated header fields.

Before receiving the resource request, the network entity can be capable of associating the header fields with the group header identifier. More particularly, the network entity can be capable of receiving an earlier request from a terminal, where the earlier request includes at least one header field and a call for associating the at least one header field with a group header identifier. After receiving the earlier request, the network entity can be capable of associating the header fields with a group header identifier, and thereafter sending the group header identifier to the terminal. In addition to associating the header fields with the group header identifier, the network entity can be capable of associating the group header identifier with alternative header fields. In this regard, the network entity can be capable of receiving a subsequent request from the terminal after sending the group header identifier to the terminal, where the subsequent request includes the group header identifier and alternative header fields. Upon receiving the subsequent request, the network entity can be capable of associating the alternative header fields with the group header identifier.

When the network entity comprises a gateway, the gateway can be capable of substituting the group header identifier in the resource request with the header fields associated with the group header identifier after identifying the header fields. In such instances, the system can also include an origin server capable of receiving the resource request including the substituted header fields. And with the resource request including the substituted header fields, the origin server can process the resource request. The system can also include a terminal capable of sending the resource request for the resource to the network entity. Advantageously, the terminal can be capable of sending the resource request at least partially over a wireless link.

According to other aspects of the present invention, a system, method and computer program product are provided for requesting a resource over at least one network, where the system includes a terminal. Embodiments of the present invention therefore provide improved systems and methods for requesting a resource, where the request has one or more associated header fields. In contrast to conventional network communication techniques, however, the requests include a group header identifier associated with one or more associated header fields, as opposed to the header fields. Then, before the requests are processed, but typically after the requests are at least partially sent over a wireless link, the header fields associated with the request can be identified based upon the group header identifier included in the request. As such, the systems and methods of embodiments of the present invention solve the problems identified by prior techniques and provide additional advantages.

BRIEF DESCRIPTION OF THE DRAWINGS

Figure 1:
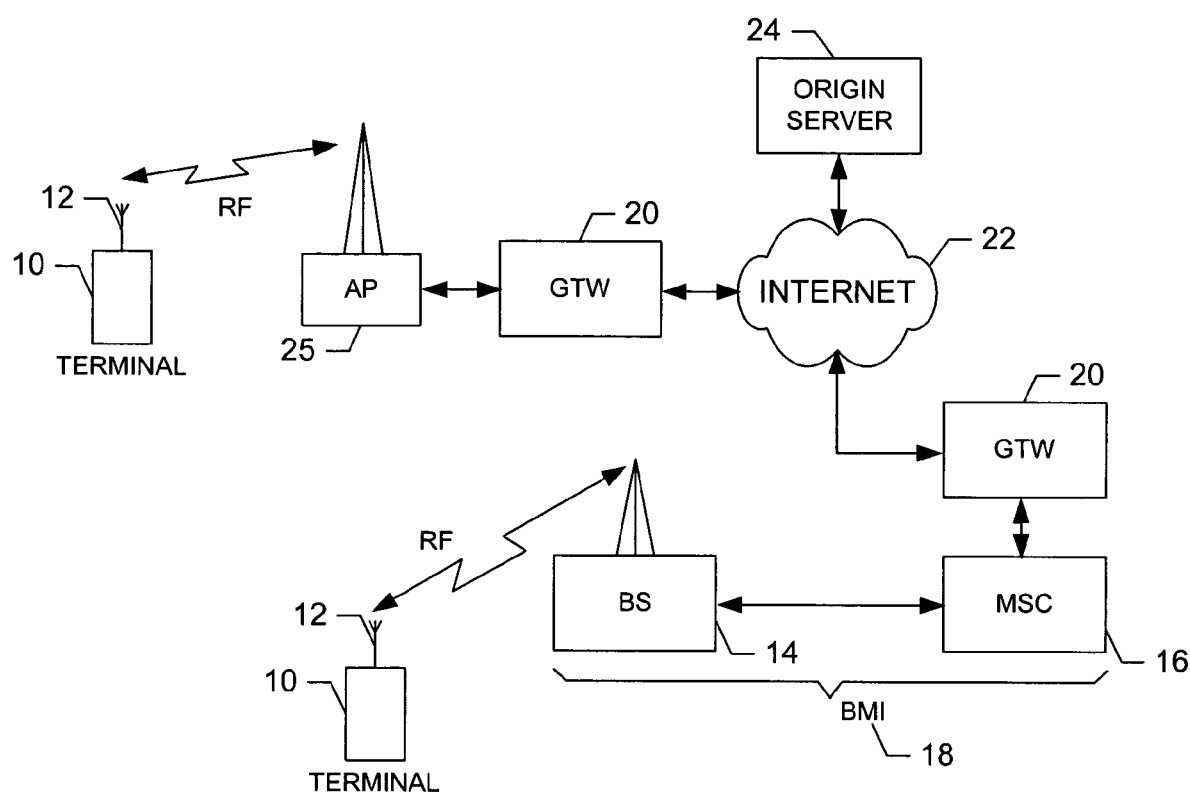
Figure 2:
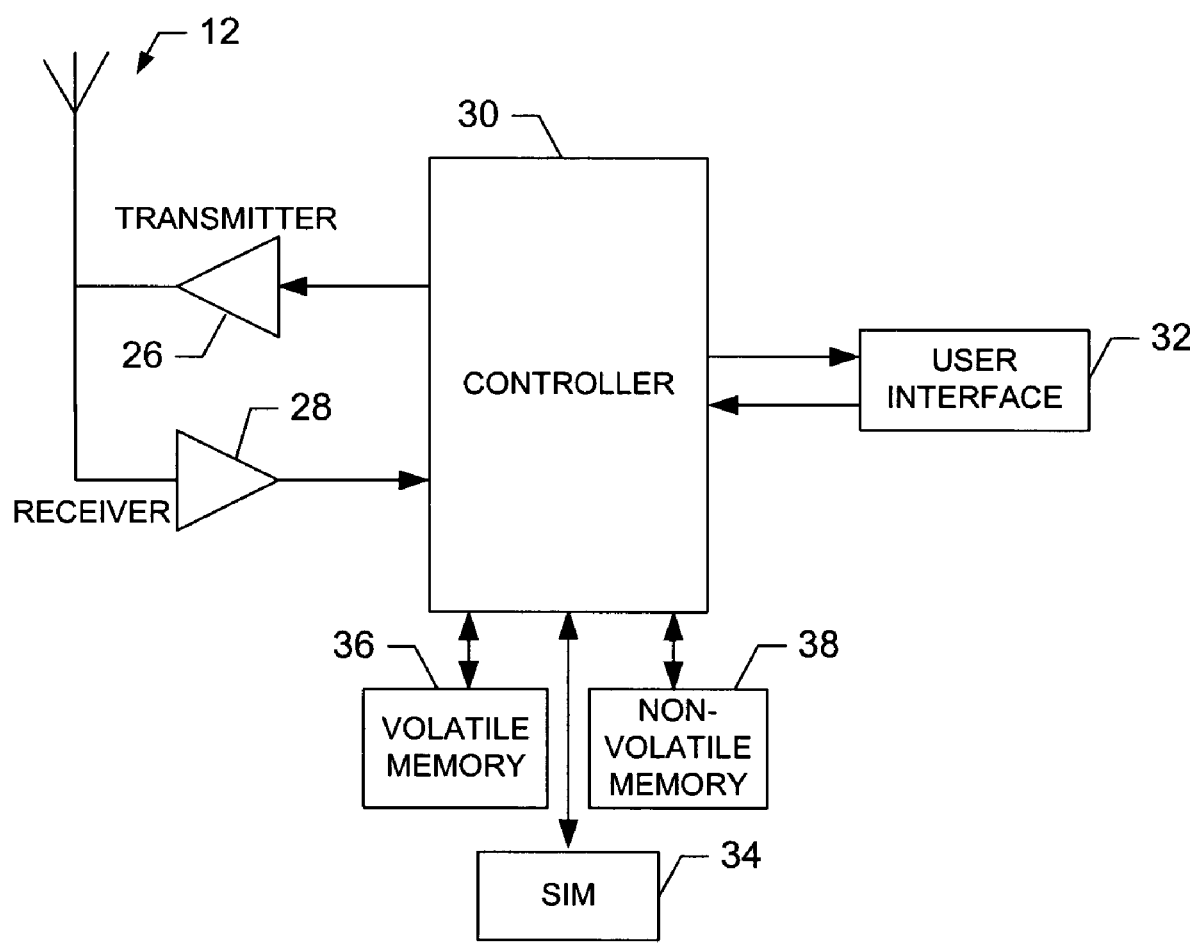
Figure 3A:
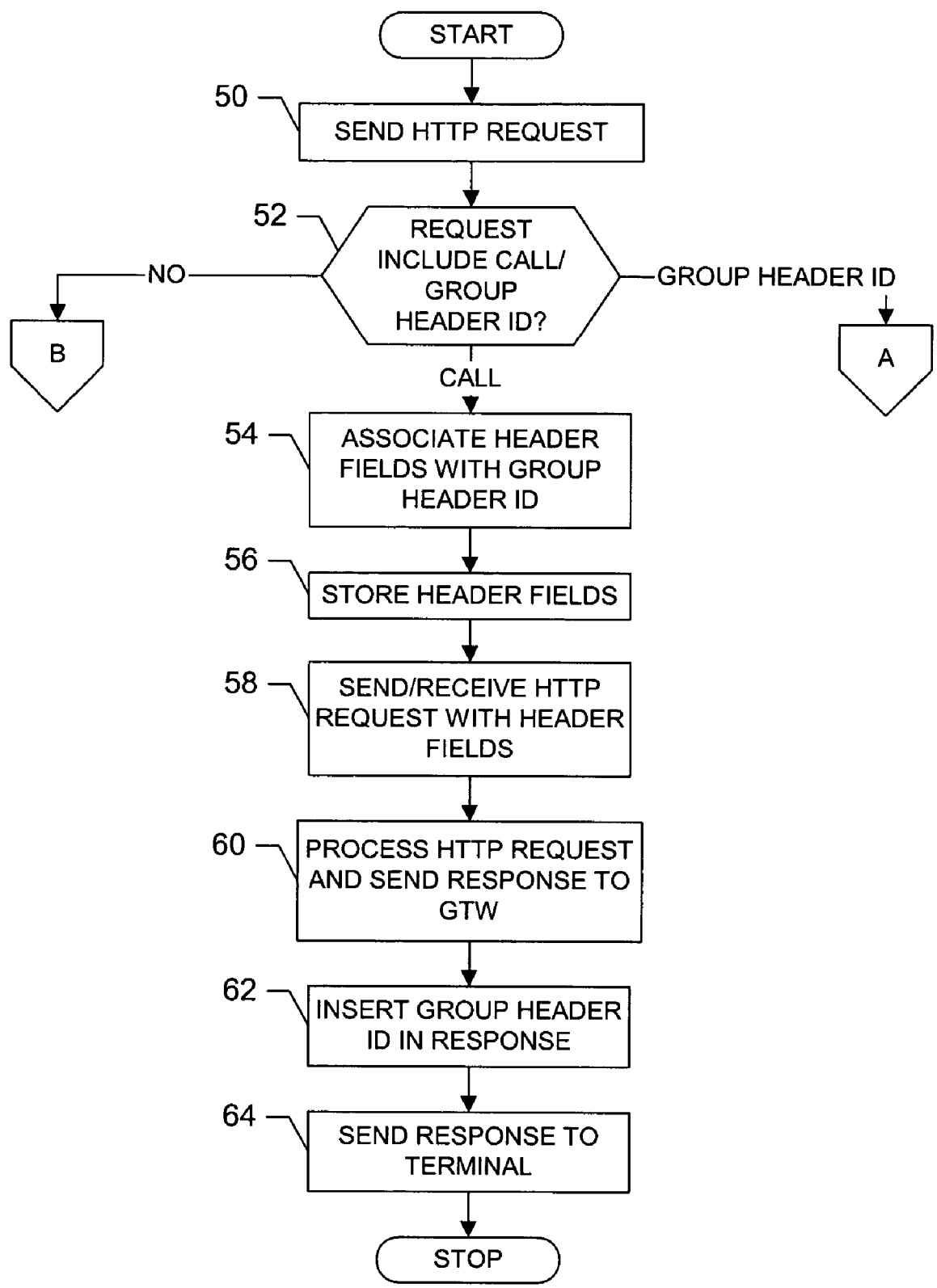
Figure 3B:
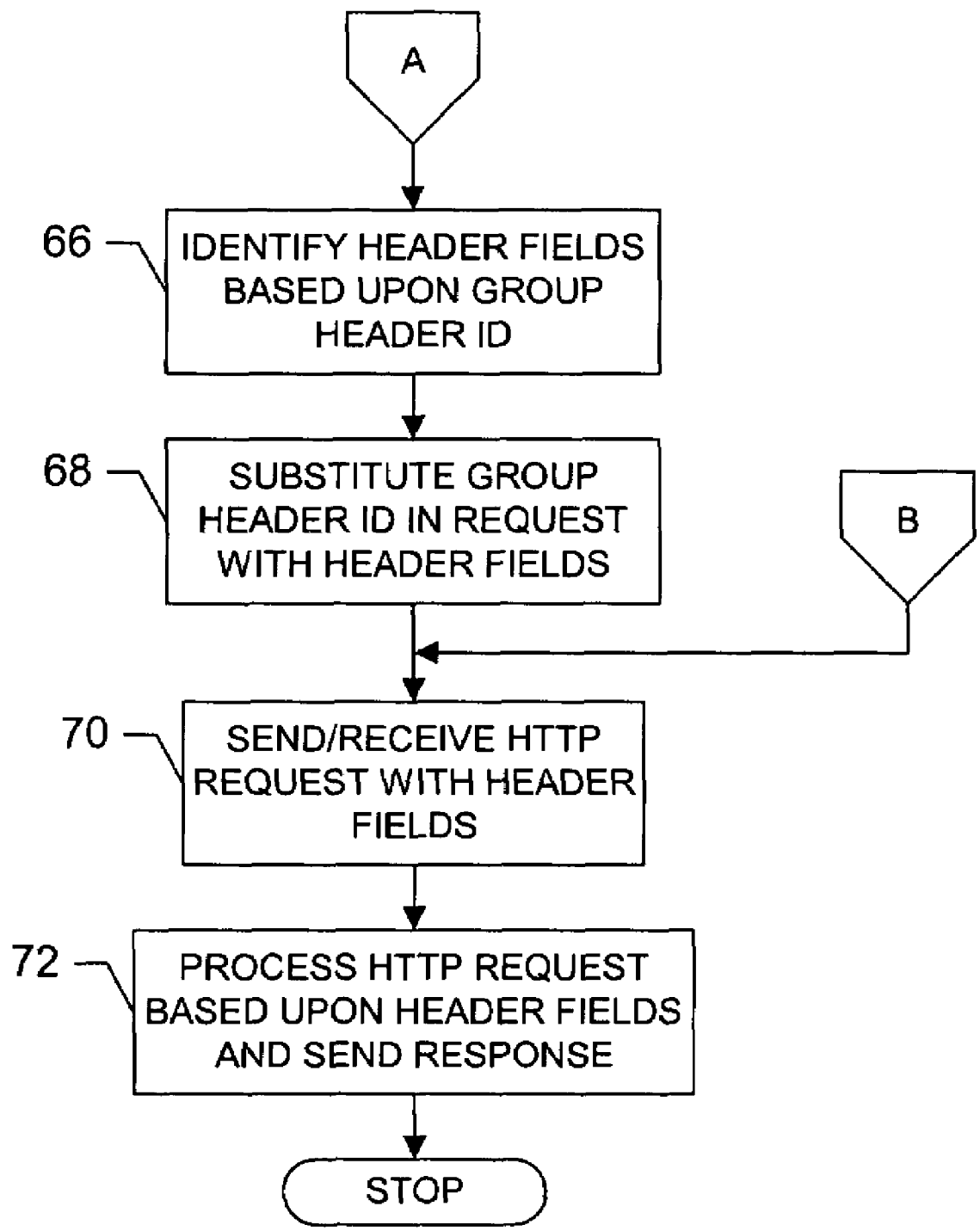
Figure 4:
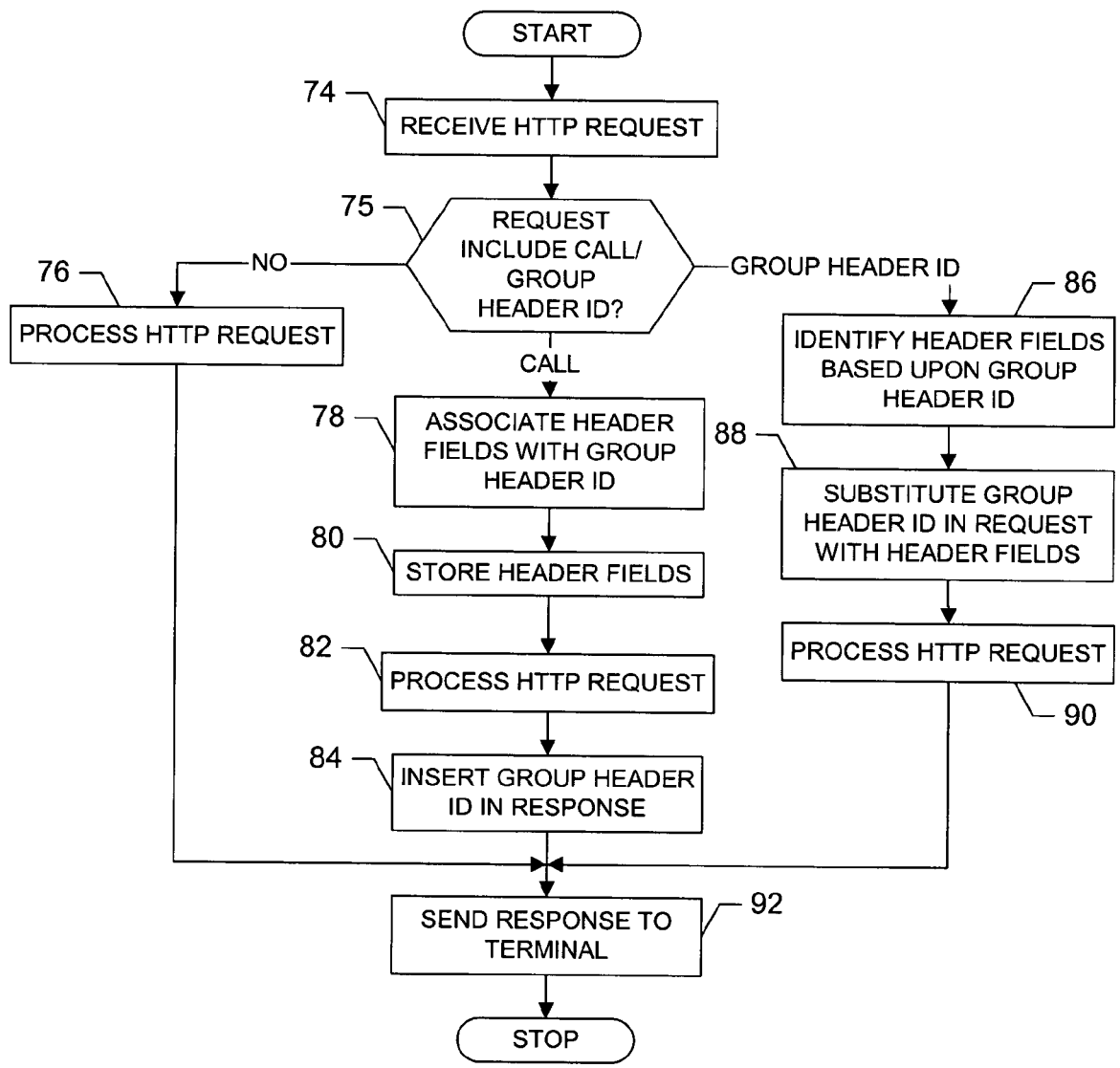

Having thus described the invention in general terms, reference will now be made to the accompanying drawings, which are not necessarily drawn to scale, and wherein:

FIG. 1 is a block diagram of a mobile communications system according to one embodiment of the present invention including a mobile station and a Base Station/MSC/Interworking function (BMI) to which the mobile station is bidirectionally coupled through wireless RF links;

FIG. 2 is a schematic diagram of a mobile station according to one embodiment of the present invention;

FIGS. 3A and 3B are flowcharts illustrating various steps in a method of requesting a resource in accordance with one embodiment of the present invention; and FIG. 4 is a flowchart illustrating various steps in a method of requesting a resource in accordance with another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, terminal and method of the present invention will be primarily described in conjunction with mobile communications applications. It should be understood, however, that the system and method of the present invention can be utilized in conjunction with a variety of other applications, both in the mobile communications industries and outside of the mobile communications industries. For example, the system and method of the present invention can be utilized in conjunction with wireline and/or wireless network (e.g., Internet) applications including communicating in accordance with the Hypertext Transfer Protocol (HTTP).

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI) 18. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 20 (Gateway).

The MSC 16 can be coupled to a network, such as a local area network (LAN), a metropolitan area network (MAN), and/or a wide area network (WAN). The MSC can be coupled to the network directly, or if the system includes a GTW 20 (as shown), the MSC can be coupled to the network via the GTW. In one typical embodiment, for example, the MSC is coupled to the GTW, and the GTW is coupled to a WAN, such as the Internet 22. In turn, devices such as processing elements (e.g., personal computers, server computers or the like) can be coupled to the terminal 10 via the Internet. For example, the processing elements can include one or more processing elements associated with an origin server 24. Additionally, the network may be coupled to one or more wireless access points (APs) 25, which may be wirelessly coupled to one or more terminals 10. By directly or indirectly connecting the terminals and the other devices (e.g., origin server) to the Internet, the terminals can communicate with the other devices and with one another, such as according to the Hypertext Transfer Protocol (HTTP), to thereby carry out various functions of the terminal.

Various of the elements of the system, including the terminal 10, GTW 20 and/or origin server 24 can comprise any of a number of different processing devices, systems or the like capable of operating in accordance with embodiments of the present invention. For example, the terminal, GTW and/or origin servers can generally include a processor connected to a memory, and may include a user interface comprising elements such as a display and/or a user input interface (e.g., keyboard, mouse or the like) coupled to the processor. The memory typically stores instructions for the processor to perform steps associated with operating the respective element in accordance with embodiments of the present invention. Also, as a GTW and/or origin server, the memory may store a local database containing, for example, stored request header field groups, as described further below. In addition, as an origin server, the memory can store resources, including for example, electronic text, audio, video and/or multimedia files, that may be retrieved, such as by terminals. The memory can store the resources in any of a number of different manners, such as at unique memory locations that may be identified by file paths, such as those that may be included within a uniform resource identifier (URI), for example. The user interface can include any of a number of known elements, such as a display and/or a user input interface (e.g., keyboard, mouse or the like), both of which are coupled to the processor.

Reference is now drawn to FIG. 2, which illustrates a block diagram of one type of terminal 10, a mobile station, that would benefit from the present invention. It should be understood, however, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of terminals, such as pagers, personal computers, laptop computers, personal digital assistants (PDAs) and other types of voice and text communications systems, can readily employ the present invention. In this regard, the terminal any of a number of different terminals that include a processing element or controller, and that are capable of communicating over the Internet 22 either directly or indirectly, such as via the wireless access point 25 and/or the BMI 18.

As shown, the mobile station includes a transmitter 26, a receiver 28, and a controller 30 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first generation (1G), second generation (2G), 2.5G and/or third-generation (3G) communication protocols or the like. For example, the mobile station may be capable of operating in accordance with 2G wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 30 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. Further, the controller may include the functionally to operate one or more software programs, which may be stored in memory (described below). For example, the controller may be capable of operating a connectivity program, such as a conventional Web browser. The connectivity program may then allow the mobile station to transmit and receive Web content, such as according to HTTP, for example.

The mobile station also comprises a user interface 32 that may include a conventional earphone or speaker, a ringer, a microphone, a display, and a user input interface, all of which are coupled to the controller 30. The user input interface, which allows the mobile station to receive data, can comprise any of a number of devices allowing the mobile station to receive data, such as a keypad, a touch display (not shown) or other input device. In embodiments including a keypad, the keypad includes the conventional numeric (0-9) and related keys (#, *), and other keys used for operating the mobile station.

The mobile station can also include memory, such as a subscriber identity module (SIM) 34, a removable user identity module (R-UIM) or the like, which typically stores information elements related to a mobile subscriber. In addition to the SIM, the mobile station can include other memory. In this regard, the mobile station can include volatile memory 36, such as volatile Random Access Memory (RAM) including a cache area for the temporary storage of data. The mobile station can also include other non-volatile memory 38, which can be embedded and/or may be removable. The memories can store any of a number of pieces of information, and data, used by the mobile station to implement the functions of the mobile station. For example, the memories can include an identifier, such as an international mobile equipment identification (IMEI) code, capable of uniquely identifying the mobile station, such as to the MSC 16.

To request a resource from a host, such as an origin server 24, a terminal 10 may send a request message, such as an HTTP request message, to the respective origin server identifying the resource at the respective location. The terminal can send the request message directly to the respective origin server, or in embodiments including the GTW 20, the terminal can send the request message to the GTW, which in turn, can forward the request message to the origin server.

Irrespective of how the terminal 10 sends, and the host (e.g., origin server 24) receives, a resource request, various request header fields are included within request messages from client devices (e.g., terminals) to define acceptable responses to the requests. For example, HTTP defines a number of header fields that are included in a resource request from a client to a host. In this regard, for a description of HTTP header fields in accordance with version 1.1 of HTTP, see IETF RFC 2616, entitled: *Hypertext Transfer Protocol— HTTP/1.1*, the contents of which are hereby incorporated by reference in its entirety.

As an example, consider the following HTTP request prepared in accordance with HTTP 1.1:
GET /path/file.html HTTP/1.1
Host: www.domain.com
Accept: audio/*; q=0.2, audio/basic
Accept-Charset: iso-8859-5, unicode-1-1; q=0.8
Accept-Encoding: *
Accept-Languages: da, en-gb; q=0.8, en; q=0.7
Range: 0-499.

In the example, "GET" specifies the operation to be performed on a resource, "/path/file.html" specifies the requested path (i.e., "/path/") and the resource (i.e., "file- .html"), and "HTTP/1.1" specifies the HTTP version of the request. Also, "Host" specifies the network location (i.e., "www.domain.com") of the resource. In addition, the header field "Accept" defines the media types (i.e., audio/*; q=0.2, audio/basic) of acceptable responses; "Accept-Charset" defines the character sets (i.e., iso-8859-5, Unicode-1-1; q=0.8) of acceptable responses; and "Accept-Encoding" defines acceptable content codings (i.e., with "*" indicating all available content coding not explicitly listed in the header field). Further, the header field "Accept-Languages" defines the sets of preferred natural languages (i.e., "da, en-gb; q-0.8, en; q=0.7) of acceptable responses; and "Range" specifies the byte ranges (i.e., 0-499) of acceptable responses.

As indicated in the background section, when transmitting data, particularly small packets of data, transport protocols such as HTTP can be swamped by the overhead associated with the inclusion of HTTP meta-data, as such may be included within request header fields. As also indicated in the background section, many request header fields typically do not change from request to request while in a browsing or other network communication session. As such, as explained in more detail below, in accordance with embodiments of the present invention, a network entity (e.g., GTW 20, origin server 24) is capable of receiving, from a client device (e.g., terminal 10), a resource request (e.g., HTTP resource request) including a header with one or more header fields.

After receiving the resource request, the network entity can group one or more header fields that are "atomic" or unchangeable within the respective group, and thereafter associate the group with a group header identifier, and store the group. The unchangeable header fields can comprise any of a number of header fields in the resource request, as such may be predetermined or identified in the resource request. For example, the unchangeable header fields can be predetermined to comprise Accept header fields within a resource request, or can be identified in the resource request.

Irrespective of the header fields associated with the group header identifier, the network entity can send the group header identifier to the client device such that the client device can send subsequent resource requests that include the group header identifier as opposed to the header fields of the respective group. Upon receiving the subsequent resource requests, the network entity can identify the header fields in the group associated with the group header identifier based upon the group header identifier. Thereafter, in embodiments in which the network entity comprises an origin server 24, the subsequent resource requests can be processed in accordance with the respective header fields. Alternatively, in embodiments in which the network entity comprises a GTW 20, the GTW, as opposed to the origin server, can substitute the group header identifiers in the requests with the header fields associated with the respective group header identifiers in the same manner. The GTW can then send the subsequent requests with the header fields to an origin server, which can thereafter process the resource requests in accordance with the respective header fields.

Referring now to FIGS. 3A and 3B, a method for requesting a resource will now be described in accordance with embodiments of the present invention. As shown and described, a client comprising a terminal 10 requests a resource from a host comprising an origin server 24, where the request is formatted in accordance with HTTP. It should be understood, however, that the client need not comprise a terminal, the host need not comprise an origin server, and the client and host need not communicate in accordance with HTTP. In this regard, the client can comprise any of a number of different devices capable of requesting a resource, and the host can comprise any of a number of different devices capable of providing the requested resource. Also, as shown and described in FIGS. 3A and 3B, the resource request from the terminal passes to a GTW 20, which can perform one or more operations on the request in accordance with embodiments of the present invention, and thereafter pass the resource request to the origin server. It should be understood, however, that the resource request need not pass through the GTW. In such instances, as shown and described below with reference to FIG. 4, the resource request can pass directly to the origin server, which performs the operations on the request otherwise performed by the GTW.

To request for a resource, as shown in block 50, the terminal 10 sends an HTTP request to the GTW 20 which, as shown in FIG. 1, can pass at least partially over a wireless link. The request can include any of a number of different elements in accordance with the appropriate transport protocol, such as HTTP. In this regard, the request can include one or more header fields, such as those described above. In addition to the conventional elements of such as request, however, the request can also include a call for associating a group of one or more header fields with a group header identifier, if a group header identifier is to be constructed or supplied. In lieu of such a call, the request can include a group header identifier associated with a group of one or more header fields if a group header identifier already exists. Further, the request need not include either a group header identifier or a call for a group header identifier, in which case the request is typically processed in a conventional manner.

The call or group header identifier can be included in the request in any of a number of different manners, such as by including the call or group header identifier as an additional request header. For example, the request can include the header "X-Intern-Group=<ID#>." In the preceding example, "X-Intern-Group" indicates that the request includes or requests a group header identifier, and "<ID#>" represents a placeholder for a value that comprises either a group header identifier, or indicates that the header defines a call for associating a group of header fields with a group header identifier. In this regard, when the header defines a call, "<ID#>" can comprise a predefined value, such as zero, interpreted as a call. As an example, the header "X-Intern-Group=1423," indicates that the request includes a group header identifier, and that the group header identifier is "1423." As another example, the header "X-Intern-Group=0" indicates that the request includes a call for a group header identifier to be associated with a group of one or more header fields.

The group header identifier can be associated with a group of header fields that, as indicated above, typically do not change from request to request while in a browsing or other network communication session. According to HTTP, for example, the group header identifier can be associated with Accept header fields (i.e., Accept, Accept-Charset, Accept-Encoding and Accept-Languages) and a Range header field. As will be appreciated, however, in various instances the terminal 10 may desire to specify which header fields to associate with a group header identifier. In such instances, the request can identify those fields to be grouped, such as by enclosing the header fields within delimiters, tags or the like.

As shown in block 52, after receiving the request, the GTW 20 can determine if the request includes a call for associating a group of header fields with a group header identifier, includes a group header identifier (ID), or does not include either a call or a group header identifier. If the request does not include either a call or a group header identifier, the GTW can send the request to the origin server 24, as shown in block 70 of FIG. 3B. Once the origin server receives the request, the origin server can process the request based upon the header fields, and thereafter send a response to the terminal 10, as shown in block 72. The response can be sent to the terminal in any of a number of different manners, such as in accordance with the same transport protocol as the request (e.g., HTTP). Also, whereas the response can be sent to the terminal independent of the GTW, in one embodiment the response is sent to the terminal via the GTW.

If the response includes a call for a group header identifier, the GTW 20 can associate a group of one or more header fields in the request with a group header identifier, as shown in block 54. Thereafter, the GTW can store the header fields in memory, such as in a database of header fields, as shown in block 56. The GTW can store the group of header fields in any of a number of different manners such that the group of header fields can be recalled, looked up or otherwise identified based upon the associated group header identifier.

At any time after receiving the request, but typically after associating the group of header fields with a group header identifier, the GTW 20 can send the request, including the group of headers associated with the group header identifier to the origin server 24, as shown in block 58. Thereafter, as illustrated in block 60, the origin server can process the request in accordance with the format of the request, e.g., HTTP. After processing the request, the origin server can send a response to the terminal 10, where the response may include the requested resource. Before the response reaches the terminal, however, the response can pass through the GTW. In this regard, when the GTW receives the response, the GTW can insert the group header identifier in the response, as shown in block 62. The group header identifier can be inserted into the response in any of a number of different manners. In one embodiment, for example, the group header identifier is inserted into the response as an additional response header in a response message to the terminal. For example, the response message can include the header "X-Intern-Response=<ID#>." In the preceding example, "X-Intern-Response" indicates that the response message includes a group header identifier, and "<ID#>" represents a placeholder for the group header identifier. For example, the header "X-Intern-Response=1423," indicates that the response includes a group header identifier, and that the group header identifier is "1423."

By receiving the group header identifier, the terminal 10 can send subsequent requests, typically during the same browsing or communication session, that include the group header identifier without including the group of header fields associated with the group header identifier. In this regard, if the GTW 20 receives a request that includes a group header identifier (see block 52), the GTW can identify the group of header fields associated with the group header identifier, as shown in block 66 of FIG. 3B. The GTW can identify the group of header fields in any of a number of different manners, such as by performing a lookup of the header fields in memory based upon the group header identifier.

After identifying the group of header fields, the GTW 20 can substitute the group header identifier in the request with the associated group of header fields, as shown in block 68. Then, the GTW can send the request including the header fields to the origin server 24, as shown in block 70. Once the origin server receives the request, as before when the request did not include either a call or a group header identifier, the origin server can process the request based upon the header fields, and thereafter send a response to the terminal 10, as shown in block 72.

As shown in FIG. 4 and described above, the GTW 20 can receive the request from the terminal 10, and operate based upon a call for associating a group of header fields with a group header identifier, or based upon group header identifier, included in the request (if either are included). It should be understood that, as indicated above, the system need not include a GTW, or the GTW need not operate in accordance with a call or group header identifier included in the request. As shown in FIG. 4, for example, the origin server 24 can receive a request from the GTW or the terminal, where the request includes a call or group header identifier, as shown in block 74, that has been merely passed along by the GTW. Thereafter, the origin server can perform operations in accordance with either, such as in a manner described above with respect to the GTW.

More particularly, as shown in block 75, after receiving the request, the origin server 24 can determine if the request includes a call for associating a group of header fields with a group header identifier, includes a group header identifier (ID), or does not include either a call or a group header identifier. If the request does not include either a call or a group header identifier, the origin server can process the request based upon the header fields, and thereafter send a response to the terminal 10, as shown in blocks 76 and 92. If the response includes a call for a group header identifier, however, the origin server can associate a group of one or more header fields in the request with a group header identifier, as shown in block 78. Thereafter, the origin server can store the header fields in memory, such as in a database of header fields, as shown in block 80. At any time after receiving the request, but typically after associating the header fields with a group header identifier, the origin server can process the request, such as in accordance with the format of the request (e.g., HTTP), as shown in block 82. Before sending the response to the terminal, however, the origin server can insert the group header identifier in the response, as shown in block 84, such as in a manner described above. Then, the origin server can send the response, including the group header identifier, to the terminal, as shown in block 92.

As before, by receiving the group header identifier, the terminal 10 can send subsequent requests, typically during the same browsing or communication session, that include the group header identifier without including the group of header fields associated with the group header identifier. In this regard, in the embodiment shown in FIG. 4, if the origin server 24 receives a request that includes a group header identifier (see block 75), the origin server can identify the associated group of header fields, as shown in block 86. After identifying the group of header fields, the origin server can process the request based upon the header fields associated with the group header identifier. In this regard, the origin server can, but need not, substitute the group header identifier in the request with the group of header fields associated with the group header identifier, as shown in block 88. Then, the origin server can process the request based upon the header fields, and thereafter send a response to the terminal, as shown in blocks 90 and 92.

As will be appreciated by those skilled in the art, the GTW 20 or origin server 24 can store the group of header fields associated with the group header identifiers for an indefinite period of time. In one advantageous embodiment, however, the GTW or origin server stores the group of header fields until communication closes between the terminal 10 and the origin server, or until the terminal ends a browsing session. Additionally, or alternatively, the GTW or origin server can store the group of header fields for a predetermined period of time. The predetermined period of time can be measured in any of a number of different manners. For example, the predetermined period of time can be measured from the time the GTW or origin server associates the header fields with the group header identifier. Additionally, or alternatively, the predetermined period of time can be measured from the time the GTW or origin server last received a request including the group header identifier, or the time the GTW or origin server sent the group header identifier to the terminal.

As will also be appreciated by those skilled in the art, in various instances, the terminal 10 may desire to overwrite the values of one or more of the header fields, or overwrite one or more header fields, associated with a given group header identifier. In such instances, the terminal can send a request to the GTW 20 or origin server 24 that includes the group header identifier. In addition to the group header identifier, however, the request includes an alternative group of one or more header fields that the terminal desires to associate with the group header identifier. Upon receiving such a request, the GTW or origin server can interpret the group header identifier and header fields as a desire on the part of the terminal to overwrite the header fields currently associated with the group header identifier to thereby associate the header fields in the request with the group header identifier.

As described above, the GTW 20 or origin server 24 can insert the group header identifier in the response to the request when the request included a call for a group of header fields to be associated with a group header identifier. It should be understood, however, that the GTW or origin server can send the group header identifier to the terminal 10 in any of a number of different manners. For example, after associating the group of header fields with the group header identifier, the GTW or origin server can send a response to the request that includes the group header identifier, such as in a header field as described above. The terminal can thereafter resend the request for the resource, where the request includes the group header identifier without the group of header fields associated with the group header identifier. The GTW or origin server can then receive the request including the group header identifier, and operate in a manner such as that described above. Alternatively, the GTW or origin server can send the group header identifier to the terminal, and without the terminal resending the request, send the request including the group of header fields to the origin server 24 if the GTW or process the request if the origin server. The origin server can then respond, such as in a manner described above.

As also described above, the GTW 20 or origin server 24 can determine whether the request includes a call for associating one or more header fields with a group header identifier, includes a group header identifier, or does not include either a call or a group header identifier. It should be understood, however, that in various instances a GTW or origin server may not be capable of interpreting a call or a group header identifier, or may not understand a group header identifier as being associated with a group of header fields. In such instances, the GTW or origin server may respond in any of a number of different manners. For example, if the GTW or origin server is not capable of interpreting a call, the GTW or origin server can respond in the same manner as if the request did not include either a call or a group header identifier. Also, for example, if the GTW or origin server receives a group header identifier not understood to be associated with a group of header fields, the GTW or origin server can respond by sending an error message (e.g., HTTP 406—Not Acceptable) to the terminal 10. Alternatively, if the origin server is capable of processing the request without the header fields that would otherwise be associated with the group header identifier, the request can be processed by the origin server without a group of header fields that would otherwise be associated with the group header identifier.

According to various embodiments of the present invention, the system, terminal 10, GTW 20 and/or origin server 24 of embodiments of the present invention generally operate under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 3A, 3B and 4 are flowcharts of methods, systems and program products according to the invention. It will be understood that each block or step of the flowcharts, and combinations of blocks or steps in the flowcharts, can be implemented by computer program instructions. These computer program instructions may be loaded onto a computer or other programmable apparatus, such as the GTW 20, to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:

receiving a resource request for a resource at a network entity, the resource request including a group header identifier;

identifying at least one header field associated with the group header identifier at the network entity; and processing the resource request in accordance with the at least one header field associated with the group header identifier, wherein before receiving the resource request for the resource, the method comprises:

associating the at least one header field with the group header identifier at the network entity, wherein associating the at least one header field with the group header identifier comprises:

receiving an earlier request at the network entity from a terminal, the earlier request including at least one header field and a call for associating the at least one header field with a group header identifier;

associating the at least one header field with a group header identifier; and sending the group header identifier to the terminal, wherein the network entity is otherwise configured, in instances in which a resource request is received without a group header identifier or call, to process the resource request independent of any group header identifier or without associating any header field with any group header identifier, and wherein the method further comprises:

receiving a subsequent request at the network entity from the terminal after sending the group header identifier to the terminal, the subsequent request including the group header identifier and an alternative at least one header field: and replacing the at least one header field associated with the group header identifier to thereby associate the alternative at least one header field with the group header identifier.

2. A method according to claim 1, wherein the network entity comprises an origin server, and wherein processing the resource request comprises processing the resource request at the origin server.

3. A method according to claim 1, wherein the network entity comprises a gateway, wherein the method further comprises:

substituting the group header identifier in the resource request with the at least one header field associated with the group header identifier after identifying the at least one header field; and sending the resource request including the substituted at least one header field to an origin server, and wherein processing the resource request comprises processing the resource request at the origin server.

4. A method according to claim 1 further comprising:

sending the resource request for the resource to the network entity from a terminal before receiving the resource request, wherein sending the resource request comprises sending the resource request to the network entity at least partially over a wireless link.

5. A method according to claim 1, wherein associating the at least one header field comprises associating the at least one header field and at least one respective value with the group header identifier, and wherein the method further comprises:

receiving a subsequent request at the network entity from the terminal after sending the group header identifier to the terminal, the subsequent request including the group header identifier and at least one associated header field with an alternative at least one respective value; and replacing the at least one value of the at least one header field associated with the group header identifier to thereby associate the at least one header field and the alternative at least one respective value with the group header identifier.

6. An apparatus comprising:

a processor configured to receive a resource request for the resource, the resource request including a group header identifier, wherein the processor is configured to identify at least one header field associated with the group header identifier such that the resource request can be processed in accordance with the at least one header field associated with the group header identifier, wherein the processor is configured to associate the at least one header field with the group header identifier before receiving the resource request for the resource, wherein the processor is configured to receive an earlier request from a terminal, the earlier request including at least one header field and a call for associating the at least one header field with a group header identifier, wherein the processor is configured to associate the at least one header field with a group header identifier, and thereafter send the group header identifier to the terminal, wherein the processor is otherwise configured, in instances in which a resource request is received without a group header identifier or call, to process the resource request independent of any group header identifier or without associating any header field with any group header identifier, and wherein the processor is configured to receive a subsequent request from the terminal after sending the group header identifier to the terminal, the subsequent request including the group header identifier and an alternative at least one header field, and wherein the processor is configured to replace the at least one header field associated with the group header identifier to thereby associate the alternative at least one header field with the group header identifier.

7. An apparatus according to claim 6, wherein the apparatus comprises an origin server.

8. An apparatus according to claim 6, wherein the apparatus comprises a gateway, wherein the processor is configured to substitute the group header identifier in the resource request with the at least one header field associated with the group header identifier after identifying the at least one header field, the resource request including the substituted at least one header field being configured for receipt and processing by an origin server.

9. An apparatus according to claim 6, wherein the processor is configured to receive the resource request for the resource from a terminal at least partially over a wireless link.

10. An apparatus according to claim 6, wherein the processor is configured to associate the at least one header field and at least one respective value with the group header identifier, wherein the processor is further configured to receive a subsequent request at the network entity from the terminal after sending the group header identifier to the terminal, the subsequent request including the group header identifier and at least one associated header field with an alternative at least one respective value, and wherein the processor is configured to replace the at least one value of the at least one header field associated with the group header identifier to thereby associate the at least one header field and the alternative at least one respective value with the group header identifier.

11. An apparatus comprising:

a processor configured to send a resource request for the resource to a network entity, the resource request including a group header identifier, wherein the processor is configured to send the resource request such that the network entity can identify at least one header field associated with the group header identifier, and such that the resource request can be processed in accordance with the at least one header field associated with the group header identifier, wherein the processor is configured to call for the network entity to associate the at least one header field with the group header identifier before sending the resource request for the resource, wherein the processor is configured to send an earlier request to the network entity, the earlier request including at least one header field and a call for associating the at least one header field with a group header identifier, wherein the processor is configured to send the earlier request such that the network entity associates the at least one header field with a group header identifier, and thereafter sends the group header identifier to the terminal, wherein the network entity is otherwise configured, in instances in which a resource request is received without a group header identifier or call, to process the resource request independent of any group header identifier or without associating any header field with any group header identifier, and wherein the processor is configured to send a subsequent request to the network entity after the network entity sends the group header identifier to the processor, the subsequent request including the group header identifier and an alternative at least one header field, and wherein the processor is configured to send the subsequent request such that the network entity replaces the at least one header field associated with the group header identifier to thereby associate the alternative at least one header field with the group header identifier.

12. An apparatus according to claim 11, wherein the processor is configured to send the resource request to a network entity comprising an origin server such that the origin server can process the resource request.

13. An apparatus according to claim 11, wherein the processor is configured to send the resource request to a network entity comprising a gateway such that the gateway can substitute the group header identifier in the request with the at least one header field associated with the group header identifier after identifying the at least one header field, and such that the gateway can send the request including the substituted at least one header field to an origin server that can process the request.

14. An apparatus according to claim 11, wherein the processor is configured to send the resource request for the resource to the network entity at least partially over a wireless link.

15. An apparatus according to claim 11, wherein the processor is configured to send the earlier request such that the network entity associates the at least one header field and at least one respective value with the group header identifier,
wherein the processor is further configured to send a subsequent request to the network entity after the network entity sends the group header identifier to the terminal, the subsequent request including the group header identifier and at least one associated header field with an alternative at least one respective value, and
wherein the processor is configured to send the subsequent request such that the network entity replaces the at least one value of the at least one header field associated with the group header identifier to thereby associate the at least one header field and the alternative at least one respective value with the group header identifier.

16. A computer program product comprising a computer-readable storage medium having computer-readable program code portions stored therein, the computer-readable program code portions comprising:
a first executable portion configured to receive a resource request for the resource at a network entity, the resource request including a group header identifier;
a second executable portion configured to identify at least one header field associated with the group header identifier at the network entity; and
a third executable portion configured to process the resource request in accordance with the at least one header field associated with the group header identifier, wherein the computer-readable program code portions further comprise:
a fourth executable portion configured to associate the at least one header field with the group header identifier at the network entity, and before the first executable portion receives the resource request for the resource, wherein the fourth executable portion being configured to associate the at least one header field with the group header includes being configured to:
receive an earlier request at the network entity from a terminal, the earlier request including at least one header field and a call for associating the at least one header field with a group header identifier;
associate the at least one header field with a group header identifier; and
send the group header identifier to the terminal,
wherein the network entity is otherwise configured, in instances in which a resource request is received without a group header identifier or call, to process the resource request independent of any group header identifier or without associating any header field with any group header identifier, and wherein the computer-readable program code portions further comprise:
a fifth executable portion configured to receive a subsequent request at the network entity from the terminal after sending the group header identifier to the terminal, the subsequent request including the group header identifier and an alternative at least one header field; and
a sixth executable portion configured to replace the at least one header field associated with the group header identifier to thereby associate the alternative at least one header field with the group header identifier.

17. A computer program product according to claim 16, wherein the third executable portion is configured to process the resource request at an origin server.

18. A computer program product according to claim 16, wherein the computer-readable program code portions further comprise:
seventh executable portion configured to substitute the group header identifier in the resource request with the at least one header field associated with the group header identifier after identifying the at least one header field; and
an eighth executable portion configured to send the resource request including the substituted at least one header field to an origin server,
wherein the third executable portion is configured to process the resource request at the origin server.

19. A computer program product according to claim 16, wherein the first executable portion is configured to receive the resource request from a terminal at least partially over a wireless link.

20. A computer program product according to claim 16, wherein the fourth executable portion is configured to associate the at least one header field and at least one respective value with the group header identifier, and wherein the computer-readable program code portions comprise:
seventh executable portion configured to receive a subsequent request at the network entity from the terminal after sending the group header identifier to the terminal, the subsequent request including the group header identifier and at least one associated header field with an alternative at least one respective value; and
an eighth executable portion configured to replace the at least one value of the at least one header field associated with the group header identifier to thereby associate the at least one header field and the alternative at least one respective value with the group header identifier.

* * * * *

UNITED STATES PATENT AND TRADEMARK OFFICE
CERTIFICATE OF CORRECTION

PATENT NO. : 7,512,715 B2
APPLICATION NO. : 10/672977
DATED : March 31, 2009
INVENTOR(S) : Marks et al.

It is certified that error appears in the above-identified patent and that said Letters Patent is hereby corrected as shown below:

Title page,
Item (75) Inventors: "Steven" should read --Stephen--.

Column 16,
Lines 30 and 50, before "seventh" insert --a--.

Signed and Sealed this

Eighteenth Day of August, 2009

David J. Kappos
*Director of the United States Patent and Trademark Office*